United States Patent
Kim et al.

(10) Patent No.: US 9,544,095 B2
(45) Date of Patent: Jan. 10, 2017

(54) CHANNEL ESTIMATION FOR PHASE-ONLY FEEDBACK AND METHODS FOR USE THEREWITH

(71) Applicant: BROADCOM CORPORATION, Irvine, CA (US)

(72) Inventors: Joonsuk Kim, Saratoga, CA (US); Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 703 days.

(21) Appl. No.: 13/875,835

(22) Filed: May 2, 2013

(65) Prior Publication Data
US 2014/0126398 A1 May 8, 2014

Related U.S. Application Data

(60) Provisional application No. 61/722,279, filed on Nov. 5, 2012, provisional application No. 61/805,855, filed on Mar. 27, 2013.

(51) Int. Cl.
| H04L 25/02 | (2006.01) |
| H04L 25/00 | (2006.01) |
| H04L 1/00 | (2006.01) |
| H04L 1/06 | (2006.01) |
| H04L 5/00 | (2006.01) |
| H04L 27/26 | (2006.01) |

(52) U.S. Cl.
CPC ........... *H04L 1/0681* (2013.01); *H04L 1/00* (2013.01); *H04L 1/0643* (2013.01); *H04L 5/0057* (2013.01); *H04L 25/022* (2013.01); *H04L 25/0202* (2013.01); *H04L 27/2613* (2013.01); *H04L 2001/0092* (2013.01)

(58) Field of Classification Search
None
See application file for complete search history.

(56) References Cited

U.S. PATENT DOCUMENTS

| 8,170,160 | B1 * | 5/2012 | Shi ....................... H04L 27/261 375/347 |
| 2007/0133458 | A1 * | 6/2007 | Chandra ............... H04L 1/0025 370/329 |
| 2007/0206504 | A1 * | 9/2007 | Koo ..................... H04B 7/0408 370/245 |
| 2008/0069031 | A1 * | 3/2008 | Zhang ................. H04B 7/0617 370/328 |

(Continued)

FOREIGN PATENT DOCUMENTS

| CN | 101156322 B | 4/2008 |
| CN | 101326848 A | 12/2008 |

(Continued)

*Primary Examiner* — Ayaz Sheikh
*Assistant Examiner* — Mariela Vidal Carpio
(74) *Attorney, Agent, or Firm* — Garlick & Markison; Bruce E. Stuckman

(57) ABSTRACT

An apparatus includes a receiver to receive a first signal from at least one additional apparatus including a data frame including a FACK request in a signal (SIG) field. A baseband processor generates feedback information for use to perform channel estimation. A transmitter transmits a second signal that includes the feedback information to the at least one additional apparatus.

16 Claims, 15 Drawing Sheets

• delivery of feedback (FB) information using ACK (combined ACK + FB exchange)

• FACK frame format

(56) References Cited

U.S. PATENT DOCUMENTS

| | | | | |
|---|---|---|---|---|
| 2010/0248635 A1* | 9/2010 | Zhang | ............... | H04B 7/0413 |
| | | | | 455/63.1 |
| 2011/0128947 A1* | 6/2011 | Liu | ............... | H04L 25/03343 |
| | | | | 370/338 |
| 2011/0188559 A1* | 8/2011 | Van Nee | ............... | H04L 5/0023 |
| | | | | 375/226 |
| 2012/0033571 A1* | 2/2012 | Shimezawa | ............ | H04B 7/026 |
| | | | | 370/252 |
| 2012/0051476 A1* | 3/2012 | Shi | ............... | H04L 25/0204 |
| | | | | 375/359 |
| 2012/0294202 A1* | 11/2012 | Joung | ............... | H04B 7/2606 |
| | | | | 370/279 |
| 2012/0327882 A1* | 12/2012 | Park | ............... | H04B 7/0632 |
| | | | | 370/329 |
| 2013/0039326 A1* | 2/2013 | Kim | ............... | H04B 7/024 |
| | | | | 370/329 |
| 2013/0083681 A1* | 4/2013 | Ebrahimi Tazeh Mahalleh | ............... | H04L 5/0057 |
| | | | | 370/252 |
| 2013/0294279 A1* | 11/2013 | Nagata | ............... | H04B 7/024 |
| | | | | 370/252 |
| 2013/0301601 A1* | 11/2013 | Takano | ............... | H04B 7/0634 |
| | | | | 370/329 |

FOREIGN PATENT DOCUMENTS

| | | | | | |
|---|---|---|---|---|---|
| WO | | 2012093666 A1 | 7/2012 | | |
| WO | WO 2012/093555 | | * | 7/2012 | ............ H04W 16/28 |

* cited by examiner

FIG. 9 • sounding procedure with null data packet (NDP)

FIG. 11 • example 1 with different Q matrix or tone grouping

FIG. 12 • example 2 with different Q matrix or tone grouping

US 9,544,095 B2

CHANNEL ESTIMATION FOR PHASE-ONLY FEEDBACK AND METHODS FOR USE THEREWITH

CROSS REFERENCE TO RELATED PATENTS/PATENT APPLICATIONS

The present U.S. Utility Patent Application claims priority pursuant to 35 U.S.C. §119 (e) to the following U.S. Provisional Patent Applications which are hereby incorporated herein by reference in their entirety and made part of the present U.S. Utility Patent Application for all purposes:
1. U.S. Provisional Application Ser. No. 61/722,279 , entitled "CHANNEL ESTIMATION FOR PHASE-ONLY FEEDBACK AND CORRESPONDING PIGGYBACK FEEDBACK FORMAT WITHIN SINGLE USER, MULTIPLE USER, MULTIPLE ACCESS, AND/OR MIMO WIRELESS COMMUNICATIONS," filed Nov. 5, 2012 ; and
2. U.S. Provisional Application Ser. No. 61/805,855 , entitled CHANNEL ESTIMATION FOR PHASE-ONLY FEEDBACK AND METHODS FOR USE THEREWITH, filed Mar. 27, 2013.

The following IEEE standards/draft standards are hereby incorporated herein by reference in their entirety and are made part of the present U.S. Provisional Patent Application for all purposes:
1. IEEE Std 802.11 ™-2012 , "IEEE Standard for Information technology—Telecommunications and information exchange between systems—Local and metropolitan area networks—Specific requirements; Part 11 : Wireless LAN Medium Access Control (MAC) and Physical Layer (PHY) Specifications," IEEE Computer Society, Sponsored by the LAN/MAN Standards Committee, IEEE Std 802.11 ™-2012 , (Revision of IEEE Std 802.11 -2007 ), 2793 total pages (incl. pp. i-xcvi, 1-2695 ).
2. IEEE Std 802.11 n™-2009 , "IEEE Standard for Information technology—Telecommunications and information exchange between systems—Local and metropolitan area networks—Specific requirements; Part 11 : Wireless LAN Medium Access Control (MAC) and Physical Layer (PHY) Specifications; Amendment 5 : Enhancements for Higher Throughput," IEEE Computer Society, IEEE Std 802.11 n™-2009 , (Amendment to IEEE Std 802.11 ™-2007 as amended by IEEE Std 802.11 k™-2008 , IEEE Std 802.11 r-2008 , IEEE Std 802.11 y™-2008 , and IEEE Std 802.11 r™-2009 ), 536 total pages (incl. pp. i-xxxii, 1 -502 ).
3. IEEE P802.11 ac™/D3.1 , Aug. 2012 , "Draft STANDARD for Information Technology—Telecommunications and information exchange between systems—Local and metropolitan area networks—Specific requirements, Part 11 : Wireless LAN Medium Access Control (MAC) and Physical Layer (PHY) specifications, Amendment 4 : Enhancements for Very High Throughput for Operation in Bands below 6 GHz," Prepared by the 802.11 Working Group of the 802 Committee, 391 total pages (incl. pp. i-xxv, 1 -366).
4. IEEE P802.11 ad™/D9.0, July 2012, (Draft Amendment based on IEEE 802.11-2012 )(Amendment to IEEE 802.11 -2012 as amended by IEEE 802.11 ae-2012 and IEEE 802.11 aa-2012 ), "IEEE P802.11 ad™/D9.0 Draft Standard for Information Technology—Telecommunications and Information Exchange Between Systems—Local and Metropolitan Area Networks—Specific Requirements—Part 11 : Wireless LAN Medium Access Control (MAC) and Physical Layer (PHY) Specifications—Amendment 3 : Enhancements for Very High Throughput in the 60 GHz Band," Sponsor: IEEE 802.11 Committee of the IEEE Computer Society, IEEE-SA Standards Board, 679 total pages.
5. IEEE Std 802.11ae™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™-2012, (Amendment to IEEE Std 802.11™-2012), 52 total pages (incl. pp. i-xii, 1-38).
6. IEEE P802.11af™/D1.06, March 2012, (Amendment to IEEE Std 802.11REVmb™/D12.0 as amended by IEEE Std 802.11ae™/D8.0, IEEE Std 802.11aa™/D9.0, IEEE Std 802.11ad™/D5.0, and IEEE Std 802.11ac™/D2.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 140 total pages (incl. pp. i-xxii, 1-118).

BACKGROUND OF THE INVENTION

Technical Field of the Invention

The invention relates generally to communication systems; and, more particularly, it relates to channel estimation within single user, multiple user, multiple access, and/or MIMO wireless communications.

Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs. The disadvantages of conventional approaches will be evident to one skilled in the art when presented the disclosure that follows.

DETAILED DESCRIPTION OF THE INVENTION

Figure 1:
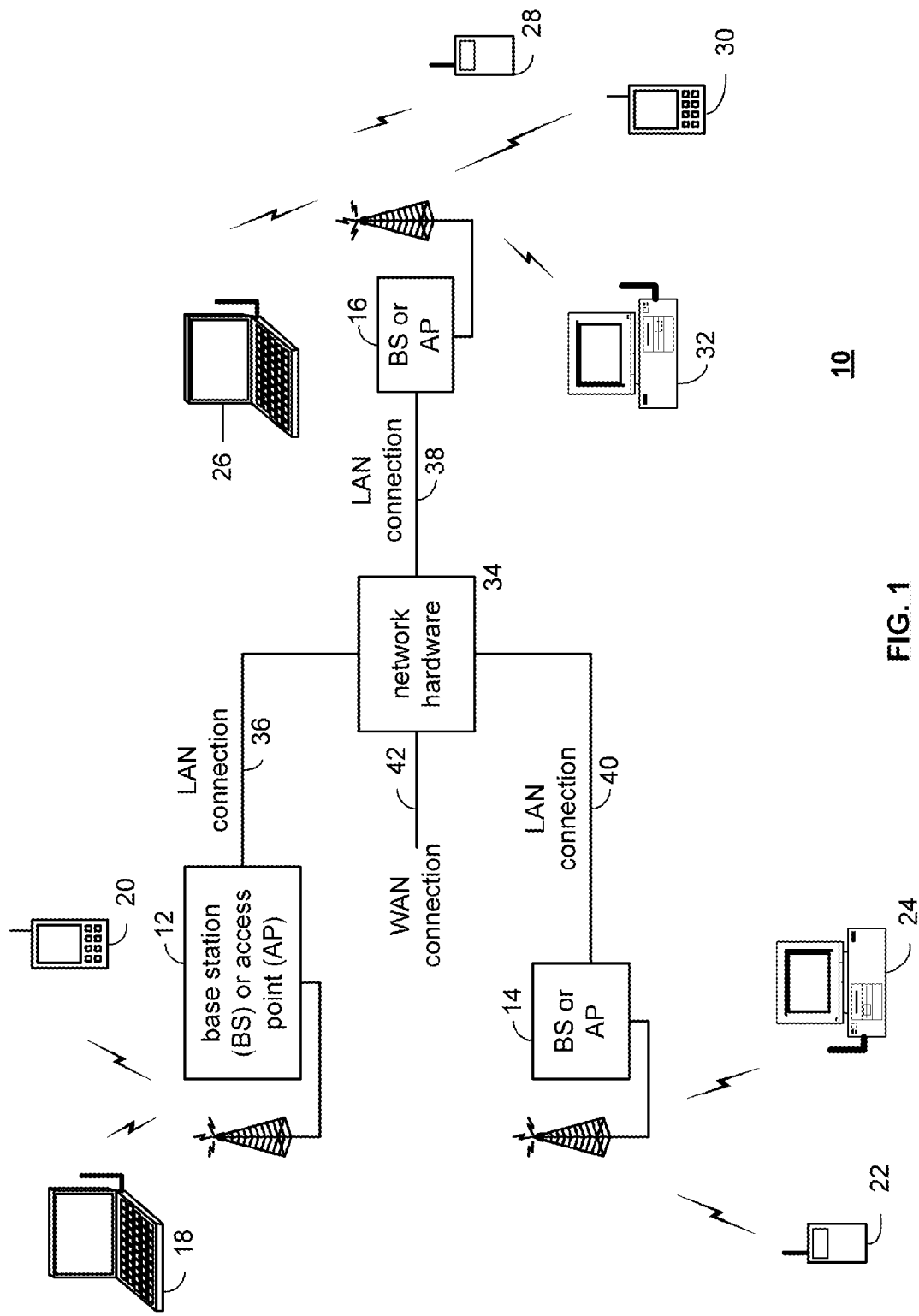
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel. Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
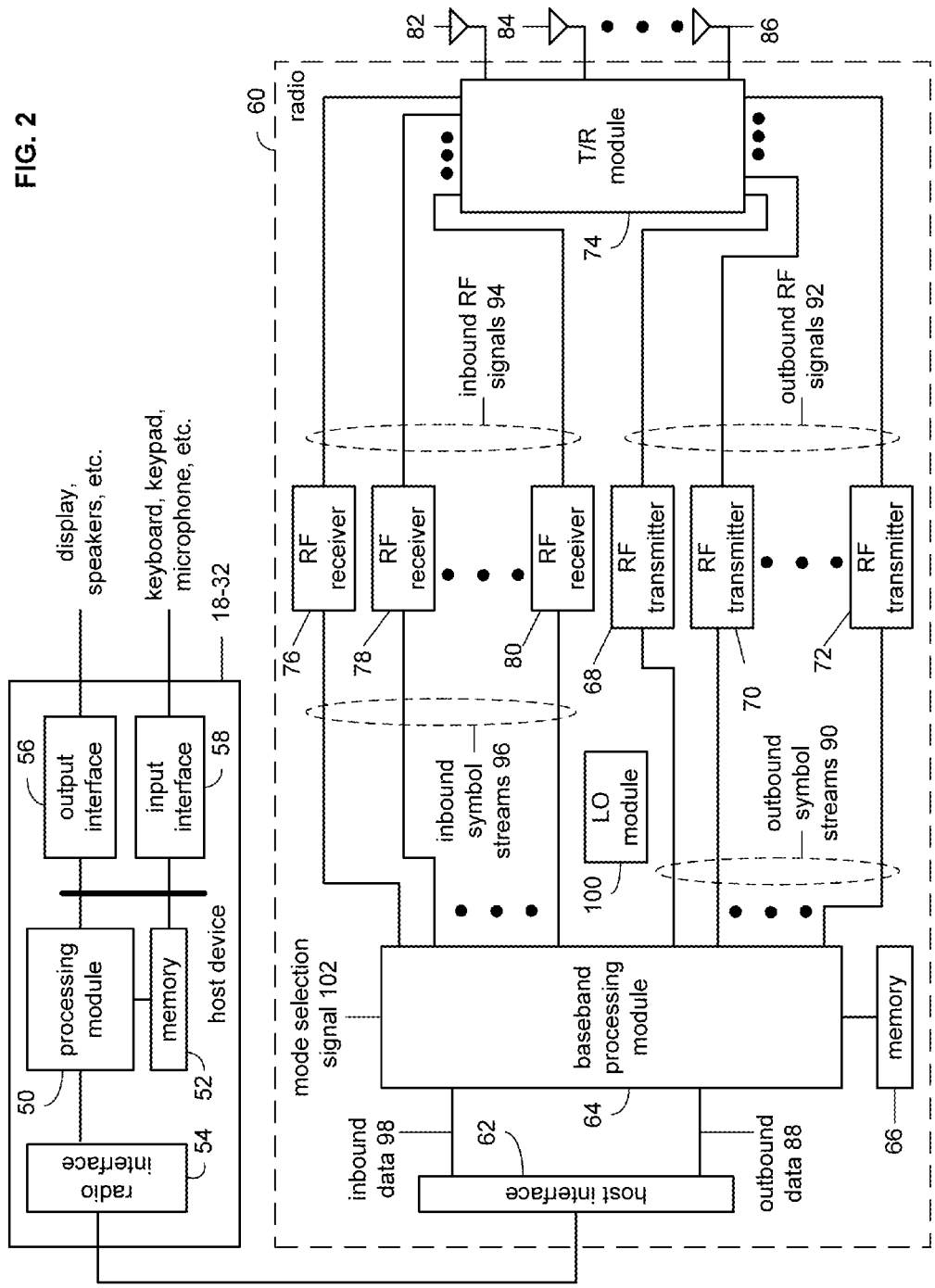
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-persecond or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. A code rate can be selected as well as number of coded bits per subcarrier (NBPSC), coded bits per OFDM symbol (NCBPS), data bits per OFDM symbol (NDBPS).

The mode selection signal may also indicate a particular channelization for the corresponding mode which includes a channel number and corresponding center frequency. The mode select signal may further indicate a power spectral density mask value. The mode select signal may, for example, indicate a 5 GHz frequency band, 20 MHz channel bandwidth and a maximum bit rate of 54 megabits-per-second. As a further alternative, the mode select signal 102 may indicate a 2.4 GHz frequency band, 20 MHz channels and a maximum bit rate of 192 megabits-per-second. The mode select would further indicate the number of antennae to be utilized. It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80 converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
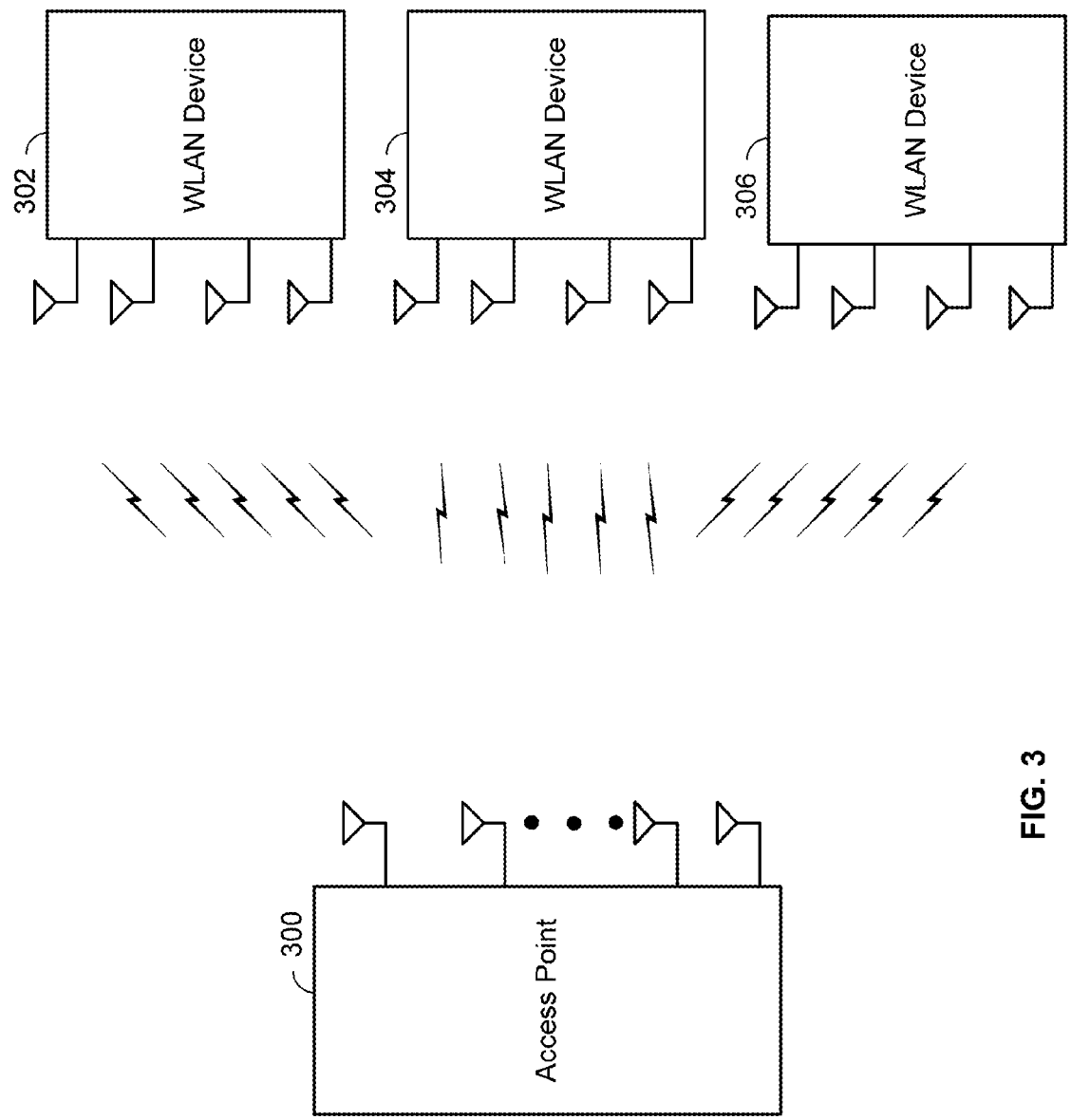
FIG. 3 is a diagram illustrating an embodiment of an access point (AP) and multiple wireless local area network (WLAN) devices operating according to one or more various aspects and/or embodiments of the invention.

FIG. 3 is a diagram illustrating an embodiment of an access point (AP) and multiple wireless local area network (WLAN) devices operating according to one or more various aspects and/or embodiments of the invention. The AP point 300 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 300 supports communications with the WLAN devices 302, 304, and 306 with channel bandwidths, MIMO dimensions, and at data throughput rates unsupported by the prior IEEE 802.11x operating standards. For example, the access point 300 and WLAN devices 302, 304, and 306 may support channel bandwidths from those of prior version devices and from 40 MHz to 1.28 GHz and above. The access point 300 and WLAN devices 302, 304, and 306 support MIMO dimensions to 4×4 and greater. With these characteristics, the access point 300 and WLAN devices 302, 304, and 306 may support data throughput rates to 1 GHz and above.

The AP 300 supports simultaneous communications with more than one of the WLAN devices 302, 304, and 306. Simultaneous communications may be serviced via OFDM tone allocations (e.g., certain number of OFDM tones in a given cluster), MIMO dimension multiplexing, or via other techniques. With some simultaneous communications, the AP 300 may allocate one or more of the multiple antennae thereof respectively to support communication with each WLAN device 302, 304, and 306, for example.

Further, the AP 300 and WLAN devices 302, 304, and 306 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time. MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 4:
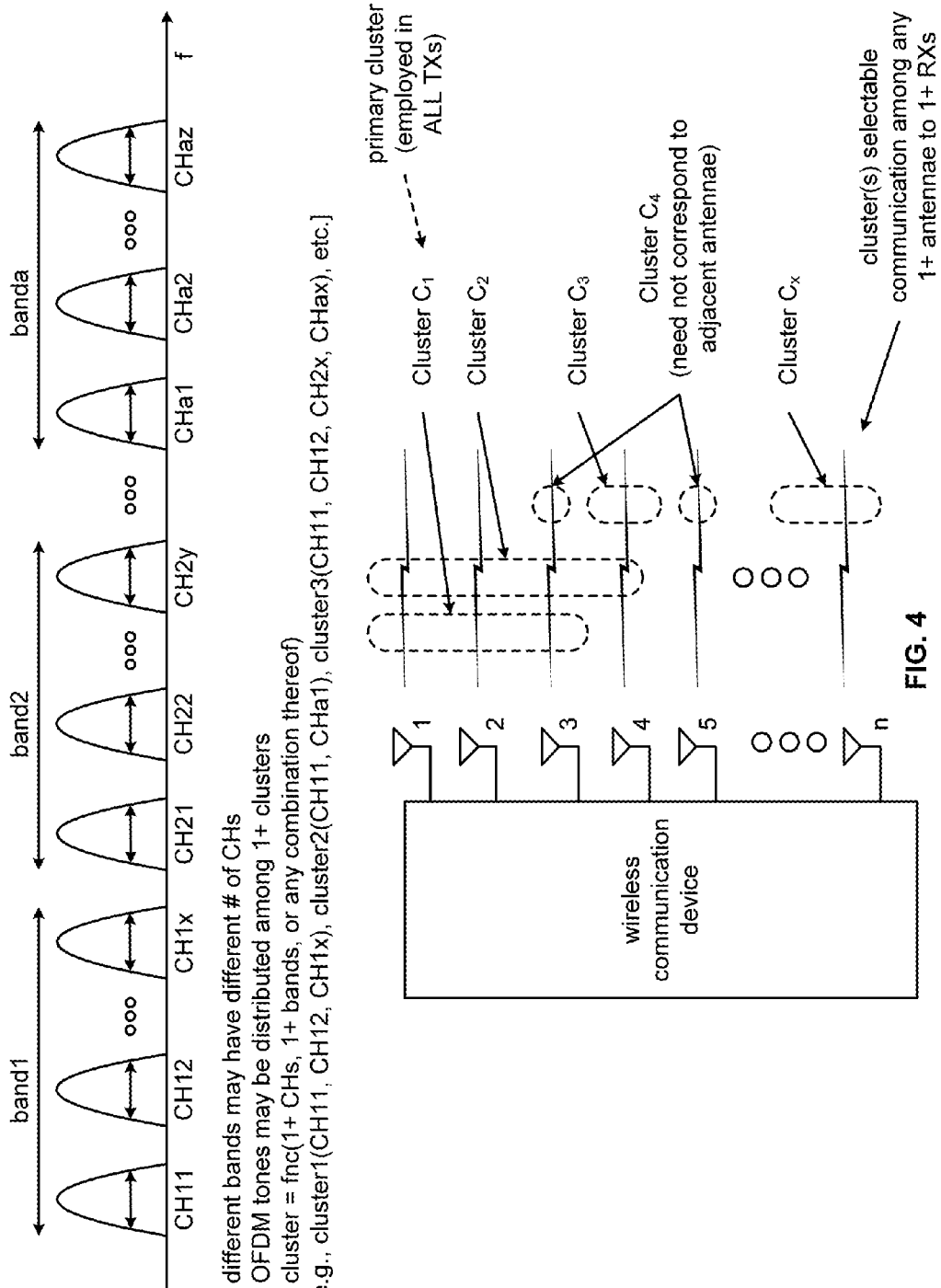
FIG. 4 is a diagram illustrating an embodiment of a wireless communication device, and clusters, as may be employed for supporting communications with at least one additional wireless communication device.

FIG. 4 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Also, it is noted that, with respect to certain embodiments, general nomenclature may be employed wherein a transmitting wireless communication device (e.g., such as being an Access point (AP), or a wireless station (STA) operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ad, ae, af, ah, etc.).

Figure 5:
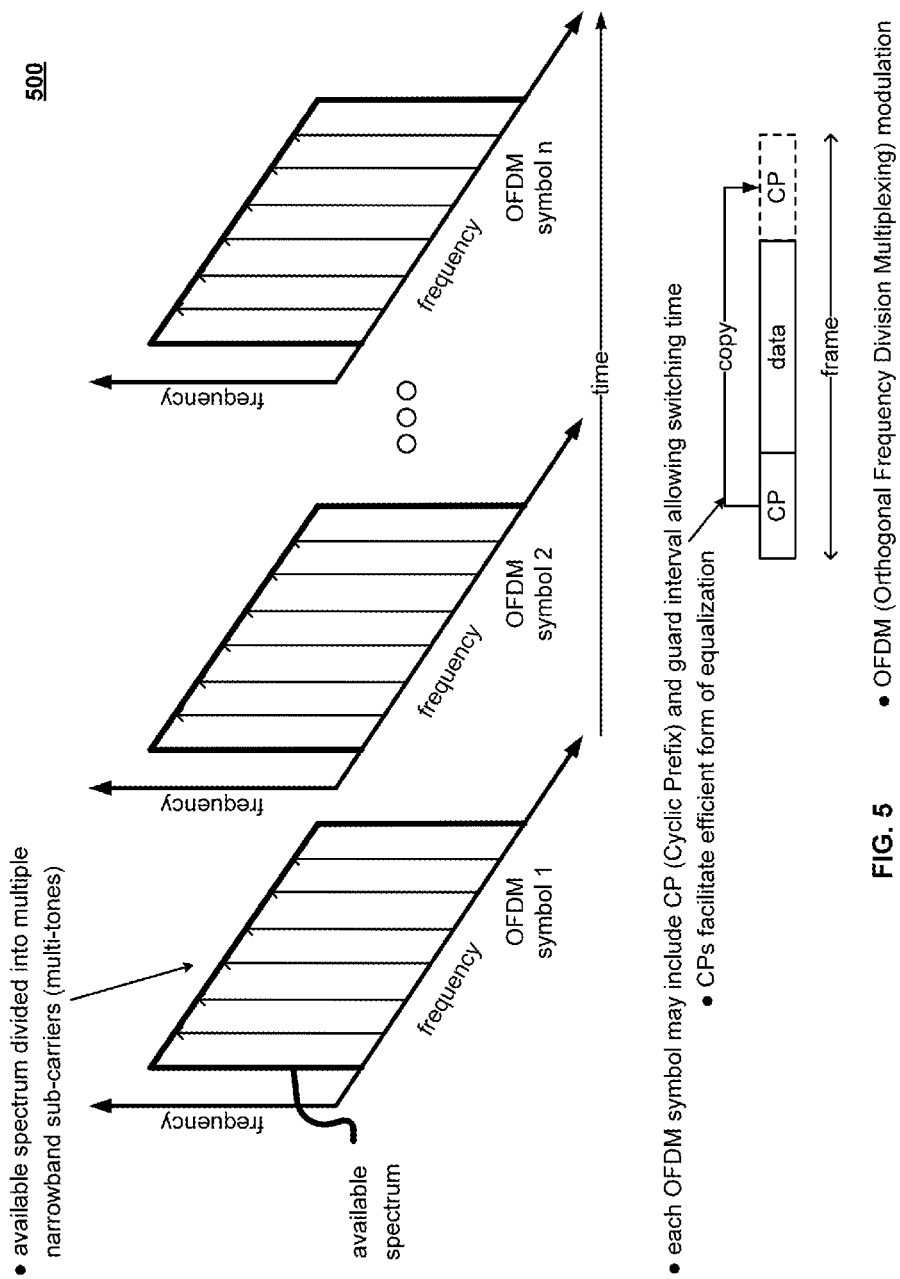
FIG. 5 illustrates an embodiment of OFDM (Orthogonal Frequency Division Multiplexing).

FIG. 5 illustrates an embodiment 500 of OFDM (Orthogonal Frequency Division Multiplexing). OFDM modulation may be viewed a dividing up an available spectrum into a plurality of narrowband sub-carriers (e.g., lower data rate carriers). Typically, the frequency responses of these sub-carriers are overlapping and orthogonal. Each sub-carrier may be modulated using any of a variety of modulation coding techniques.

OFDM modulation operates by performing simultaneous transmission of a larger number of narrowband carriers (or multi-tones). Oftentimes a guard interval (GI) or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols. Generally speaking, OFDM system design is based on the expected delay spread within the communication system (e.g., the expected delay spread of the communication channel).

In certain instances, various wireless communication devices may be implemented to support communications associated with monitoring and/or sensing of any of a variety of different conditions, parameters, etc. and provide such information to another wireless communication device. For example, in some instances, a wireless communication device may be implemented as a smart meter station (SM-STA), having certain characteristics similar to a wireless station (STA) such as in the context of a wireless local area network (WLAN), yet is operative to perform such communications associated with one or more measurements in accordance with monitoring and/or sensing. In certain applications, such devices may operate only very rarely. For example, when compared to the periods of time in which such a device is in power savings mode (e.g., a sleep mode, a reduced functionality operational mode a lowered power operational mode, etc.), the operational periods of time may be miniscule in comparison (e.g., only a few percentage of the periods of time in which the device is in such a power savings mode).

For example, such a device may awaken from such a power savings mode only to perform certain operations. For example, such a device may awaken from such a power savings mode to perform sensing and/or measurement of one or more parameters, conditions, constraints, etc. During such an operational period (e.g., in which the device is not in a power savings mode), the device may also perform transmission of such information to another wireless communication device (e.g., an access point (AP), another SMSTA, a wireless station (STA), or such an SMSTA or STA operating as an AP, etc.). It is noted that such a device may enter into an operational mode for performing sensing and/or monitoring at a frequency that is different than (e.g., greater than) the frequency at which the device enters into an operational mode for performing transmissions. For example, such a device may awaken a certain number of times to make successive respective sensing and/or monitoring operations, and such data as is acquired during those operations may be stored (e.g., in a memory storage component within the device), and during a subsequent operational mode dedicated for transmission of the data, multiple data portions corresponding to multiple respective sensing and/or monitoring operations may be transmitted during that operational mode dedicated for transmission of the data.

Also, it is noted that, in certain embodiments, such a device may include both monitor and/or sensor capability as well as wireless communication capability. In other embodiments, such a device may be connected and/or coupled to a monitor and/or sensor and serve to effectuate wireless communications related to the monitoring and/or sensing operations of the monitor and/or sensor.

The application contexts of such devices may be very, and some exemplary those non-exhaustive embodiments are provided in described below for illustrations the reader. It is also noted that, in some applications, some of the devices may be battery operated in which energy conservation and efficiency may be of high importance. In addition, there are a number of applications in which such devices may be used besides in accordance with smart meter applications; for example, certain wireless communication devices may be implemented to support cellular offload and/or other applications that are not normally or traditionally associated with WLAN applications. Some applications are particularly targeted and directed towards use in accordance with and in compliance with the currently developing IEEE 802.11ah standard.

Various mechanisms by which access to the communication media may be achieved may be different and particularly tailored for different contexts. For example, different communication access schemes may be applied at different respective times. That is to say, during a first time or during a first time period, a first communication medium access approach may be employed. During a second time or during a second time period, a second communication medium access approach may be employed. It is noted that the particular communication medium access approach employed any given time may be adaptively determined based upon one or more prior communication medium access approaches employed during one or more time periods.

Also, in an application in which there are multiple wireless communication devices implemented therein, different respective time periods may be employed for different groups of those wireless communication devices. For example, considering an embodiment in which multiple STAs or operative within a given communication device, those respective STAs may be subdivided into different respective groups that may have access to the communication medium a different respective time periods. It is noted that anyone given STA may be categorized within more than one group, in that, different respective groups of STAs may have some overlap in their respective contents. By using different respective time periods for use by different respective groups of devices, an increase in media access control (MAC) efficiency may be achieved among anyone or more of the respective devices within the wireless communication system. Also, by ensuring appropriate operation of the overall system, power consumption may be decreased as well. As mentioned above, this can be of utmost importance in certain applications such as those in which one or more of the devices are battery operated and energy conservation is of high importance. Also, utilizing different respective time periods for use by different groups of STAs can allow for simplification in accordance with MAC or physical layer (PHY) processing. For example, certain embodiments may employ preamble processing (e.g., such as in accordance with distinguishing between normal range and/or extended range type communications) for simplification. In addition, the MAC protocol employed for certain respective time periods can be simplified.

It is noted that the in accordance with various aspects, and their equivalents, of the invention described herein may be generally applied to wireless communication devices including any number of types of wireless communication devices (e.g., STAs, APs, SMSTAs, and/or any combination thereof, etc.), certain desired embodiments are particularly tailored towards use with one or more SMSTAs.

Figure 6:
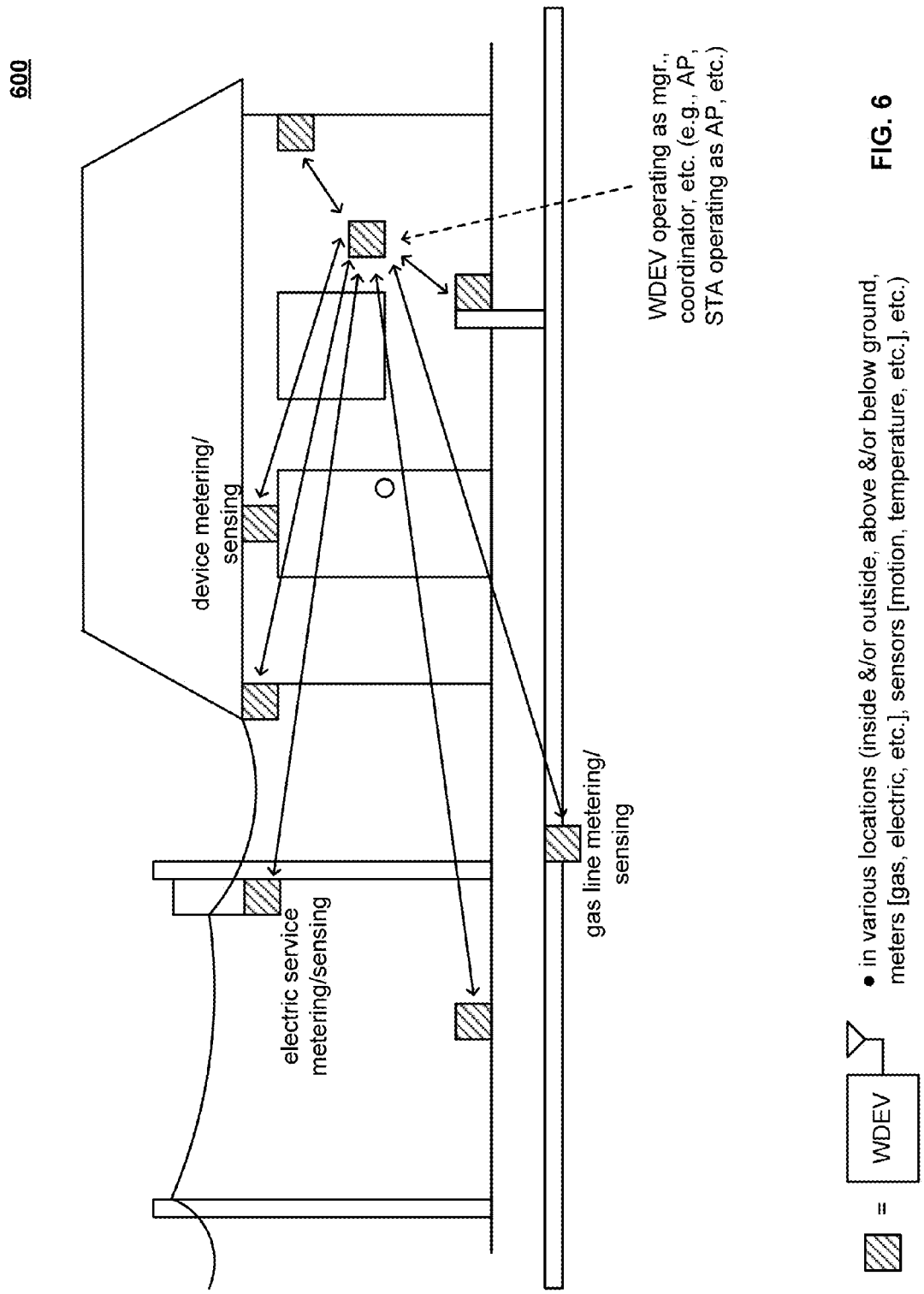
FIG. 6 illustrates an embodiment of a number of wireless communication devices implemented in various locations in an environment including a building or structure.

FIG. 6 illustrates an embodiment 600 of a number of wireless communication devices implemented in various locations in an environment including a building or structure. In this diagram, multiple respective wireless communication devices are implemented to forward information related to monitoring and/or sensing to one particular wireless communication device that may be operating as a manager, coordinator, etc. such as may be implemented by an access point (AP) or a wireless station (STA) operating as an AP. Generally speaking, such wireless communication devices may be implemented to perform any of a number of data forwarding, monitoring and/or sensing operations. For example, in the context of a building or structure, there may be a number of services that are provided to that building or structure, including natural gas service, electrical service, television service, Internet service, etc. Alternatively, different respective monitors and/or sensors may be implemented throughout the environment to perform monitoring and/or sensing related to parameters not specifically related to services. As some examples, motion detection, temperature measurement (and/or other atmospheric and/or environmental measurements), etc. may be performed by different respective monitors and/or sensors implemented in various locations and for various purposes.

Different respective monitors and/or sensors may be implemented to provide information related to such monitoring and/or sensing functions wirelessly to the manager/coordinator wireless communication device. Such information may be provided continuously, sporadically, intermittently, etc. as may be desired in certain applications.

In addition, it is noted that such communications between such a manager/coordinator wireless communication device of the different respective monitors and/or sensors may be cooperative in accordance with such bidirectional indications, in that, the manager/coordinator wireless communication device may direct the respective monitors and/or sensors to perform certain related functions at subsequent times.

Figure 7:
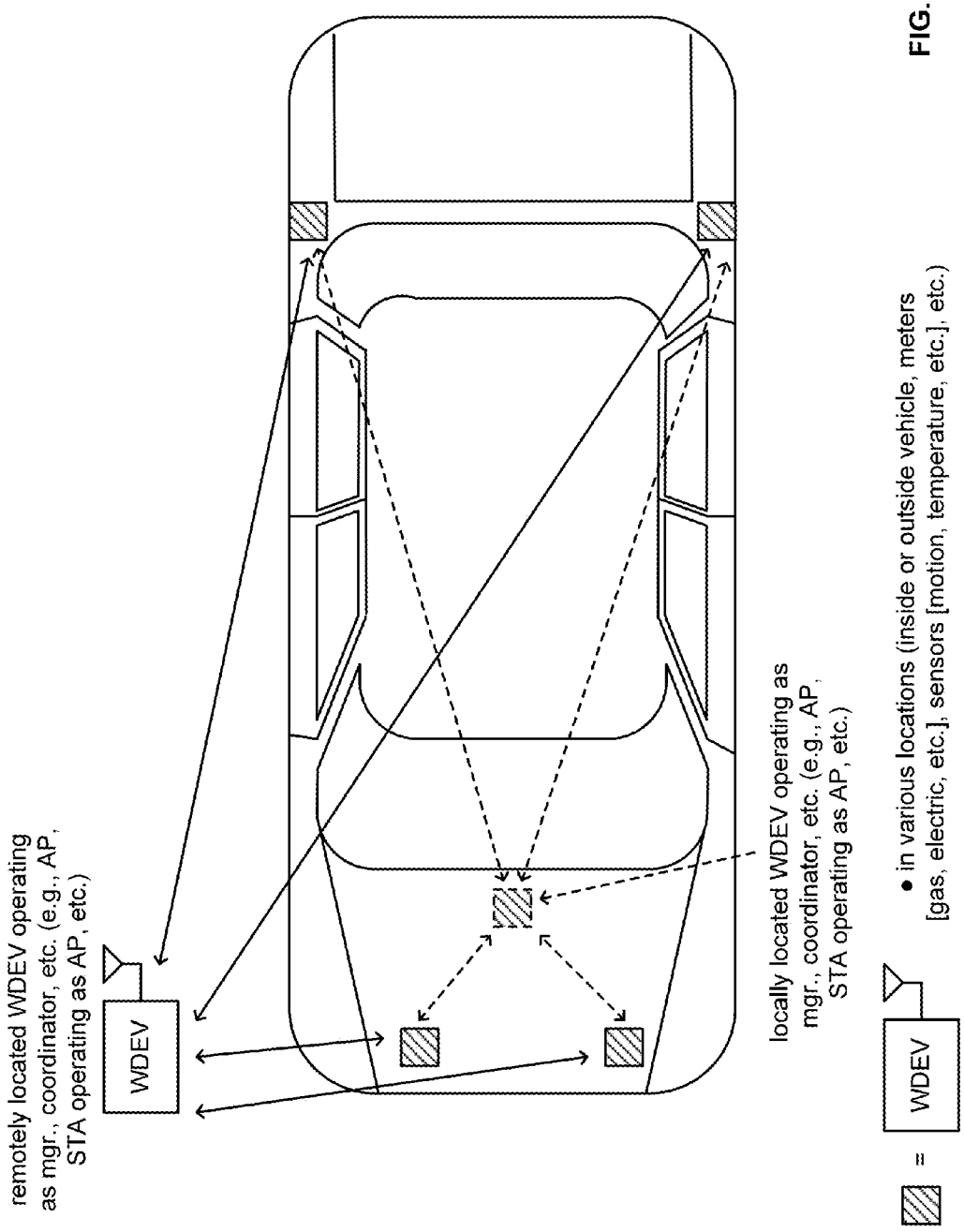
FIG. 7 illustrates an embodiment of a number of wireless communication devices implemented in various locations in a vehicular environment.

FIG. 7 illustrates an embodiment 700 of a number of wireless communication devices implemented in various locations in a vehicular environment. This diagram pictorially depicts a number of different sensors implemented throughout a vehicle which may perform any of a number of monitoring and/or sensing functions. For example, operational characteristics associated with different mechanical components (e.g., temperature, operating condition, etc. of any of a number of components within the vehicle, such as the engine, compressors, pumps, batteries, etc.) may all be monitored and information related to that monitoring may be provided to a coordinator/manager wireless communication device.

Figure 8:
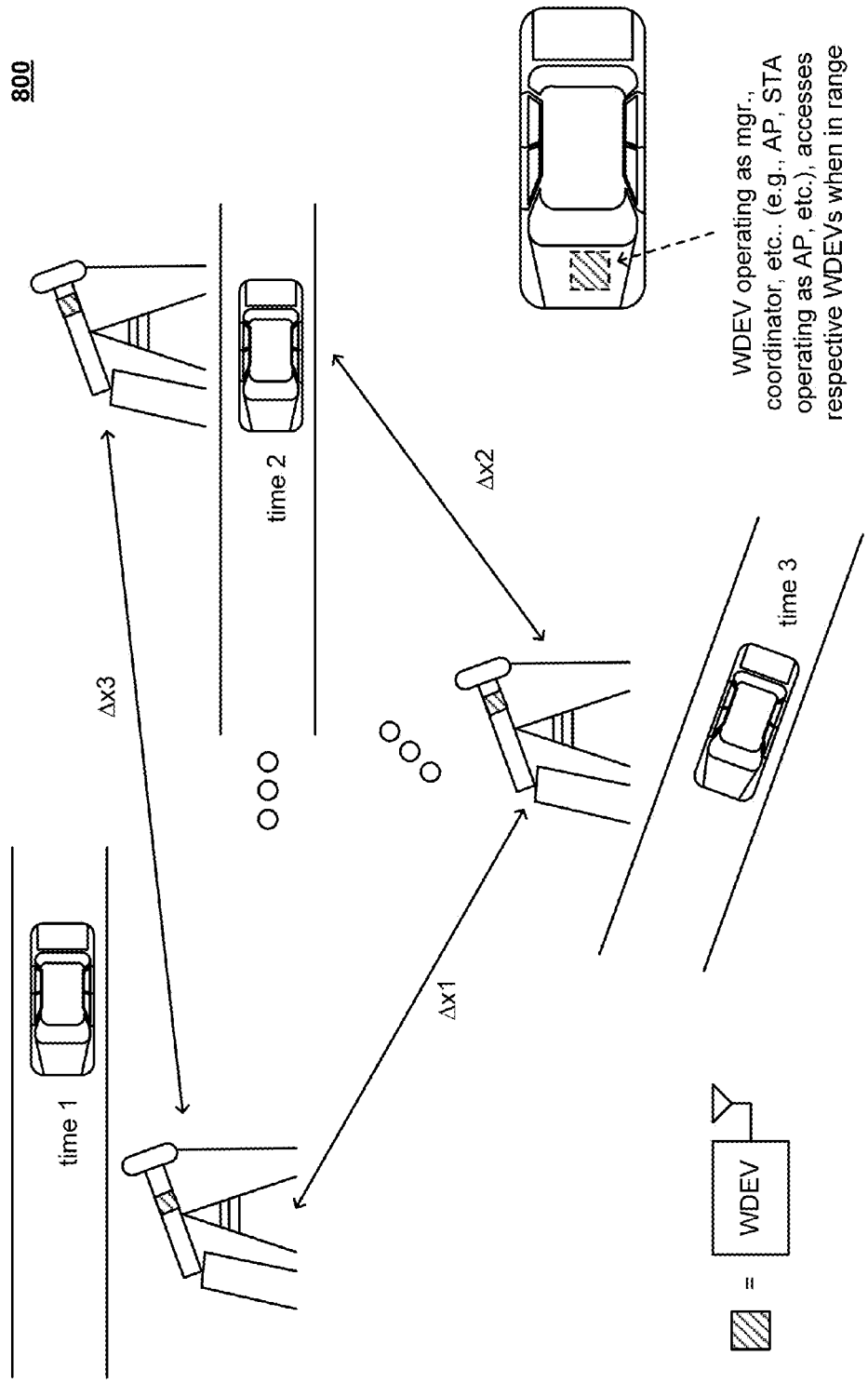
FIG. 8 illustrates an embodiment of a number of wireless communication devices implemented in various locations throughout a broadly distributed industrial environment.

FIG. 8 illustrates an embodiment 800 of a number of wireless communication devices implemented in various locations throughout a broadly distributed industrial environment. This diagram pictorially illustrates a number of different respective sensors that may be implemented in various locations are very remote with respect to one another. This diagram relates to a number of sensors was may be implemented within different locations that have little or no wireless communication infrastructure associated therewith. For example, in the oil industry, different respective pumps may be implemented in very remote locations, and service personnel need physically to visit the different respective locations to ascertain the operation of the various equipment and components there. A manager/coordinator wireless communication device may be implemented within a vehicle, or within a portable component such as laptop computer included within the vehicle, and as the vehicle travels to each respective location in which there are such sensing and/or monitoring devices. As the manager/coordinator wireless communication device enters within sufficient proximity such that wireless communication may be supported with the different respective sensing and/or monitoring devices, information related to such monitoring and/or sensing functions may be provided to the manager/ordinate wireless communication device.

While various respective and exemplary embodiments have been provided here for illustration to the reader, it is noted that such applications are non-exhaustive and that any of a variety of application contexts may be implemented such that one or more wireless communication devices are implemented throughout an area such that those one or more wireless communication devices may only occasionally provide information to a manager/ordinate wireless communication device. Any such application or communication system may operate in accordance with the in accordance with various aspects, and their equivalents, of the invention.

Various aspects, embodiments, and/or their equivalents, of the invention, are directed to providing for a novel design of a feedback frame for a single stream. In accordance with such feedback, phase-aligned space time block coding (STBC) can be enabled, and beamforming may also be employed for noticeable gain using phase-only information (e.g., such feedback including at least phase-only information). Consideration is provided regarding feedback overhead in view of the current feedback format. For example, a null data packet (NDP) frame format requires relatively a lot of other network overhead to send a sounding frame. In accordance with such operation, the feedback information reduction, considering the NDP frames, may become marginal in certain situations.

Figure 9:
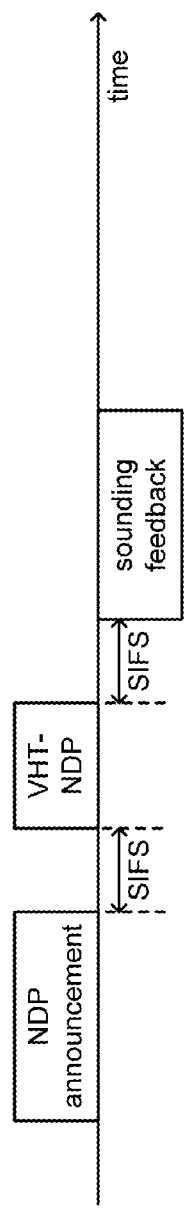
FIG. 9 illustrates an embodiment of a sounding procedure with null data packet (NDP).

FIG. 9 illustrates an embodiment 900 of a sounding procedure with null data packet (NDP). With respect to this diagram, operation is made using 2 TX sounding (2 MHz). In accordance with such operation, NDP-A has 9 OFDM symbols for physical layer (PHY) preamble and 8 OFDMs symbols for PHY payload. The NDP has 10 OFDM symbols. The sounding feedback (FB) has 9+12+4 OFDM symbols (MCSO with tone grouping of 4). Even if the angle information is reduced by a factor of half (e.g., phase-only), the sounding FB becomes 9+12+2 OFDM symbols. Also, a certain number (e.g., 4) short interframe spaces (SIFSs) may be added in some embodiments.

The use of phase-only information in accordance with feedback with only a few bits per tone feedback may provide adequately accurate channel estimation in some instances. For example, if desired, a quick-estimation-and-go approach may be sufficient. Using such an approach would obviate any need to estimate the channel with the quality of −30-ish dB of MSE (mean squared error). With only a few bits quantization for one or two parameters, such operation may have a relatively or quite bad quantization error already. However, in some applications, a −5 to −10 dB of MSE quality may be adequate, acceptable, or good enough for that purpose.

A description of such an abbreviated channel estimation is provided below. For an Nt×1 configuration, a transmitter may send a single stream packet with one long training field (LTF). Estimation of Nt×1 channels may be made from one LTF, without initiating NDP sounding frames. Such feedback information (e.g., a few bytes) can be delivered back to the transmitter wireless communication device (e.g., access point (AP), wireless station (STA) operating as an AP, etc.) via piggyback (e.g., such as within FIG. 15). Such a receiver wireless communication device (e.g., STA, etc.) may also group Ng tones for channel estimation process.

A receiver wireless communication device (e.g., STA) groups Ng tones for channel estimation process as follows:

$$\begin{bmatrix} y_{k_1} \\ \vdots \\ y_{k_{N_g}} \end{bmatrix} = \begin{bmatrix} h_{1k_1} & \cdots & h_{N_t k_1} \\ \vdots & \ddots & \vdots \\ h_{1k_{N_g}} & \cdots & h_{N_t k_{N_g}} \end{bmatrix} \times Q \times D \times T + N$$

Q is a unitary matrix, D is a diagonal cyclic shift delay (CSD) matrix and T is a tall training vector (N is AWGN). Q, D and T can be different per tone k, i.e., Q is a Ng×(Nt Ng) matrix, D is a (Nt Ng)×(Nt Ng) block diagonal matrix and T is a (Nt Ng)×1 column vector. Assuming $h_{ikj}=h_{ikm}$, where $1<=j,m <=Ng$ and $i=1, \ldots, Nt$, the estimate h of the channel can be made from the received signal, y, as long as Ng>=Nt. The feedback information is grouped per Ng tones anyway.

With the assumption $h_{ikj}=h_{ikm}$, the received signal can be expressed as follows:

$$[\tilde{y}_{k_1} \cdots \tilde{y}_{k_{N_g}}] = [h_{1k} \cdots h_{N_tk}] \times [P_{k_1} \cdots P_{k_{N_g}}] + N$$

$\tilde{y}_k = y_{ik}$ is coming from $h_{ikj}=h_{ikm}$ assumption $P_k = Q_{ik} \times D_{ik} \times T_{ik}$ where $Q_k$ is a unitary matrix (Nt×Nt), $P_{ik}$ is a diagonal matrix with CSD (Nt×Nt), $T_{ik}$ is a training sequence (Nt×1) and AWGN N (1×Ng).

The channel estimator may be designed as follows:

$$W = P^H(PP^H + N_0 I)^{-1}, \text{ where } P = [P_{k_1} \cdots P_{k_{N_g}}]$$

and $N_0$ is AWGN noise power.

Then, the estimated channel is as follows:

$$[\tilde{h}_{k_1} \cdots \tilde{h}_{k_{N_g}}] = [y_{k_1} \cdots y_{k_{N_g}}] \times W$$

As such, there will be Nt variables to estimate by using inverse matrix of $PP^H$. So, the condition number of P matrix may give an impact on the inversion operation. A better design may be provided such that each column of P matrix to be orthogonal each other. In other words, in some embodiments, it may be better to randomize $P_k$ tone by tone. In either example, the $P_k$ design needs to be known at the receiver wireless communication device (e.g., STA). A larger CSD value in Dk may be employed, which varies more tone by tone. Also, CSD values are fixed in the IEEE 802.11 specification, but additional CSD values may be added in the diagonal Q matrix. In such a design, Qk can be generated via fast Fourier transform (FFT) matrix or Hadamard matrix, and the cyclic-shift may be implemented on a tone by tone basis. Iterative design may be applied, and the value of $y_k$ may be reconstructed from the estimated channel and then used to re-estimate $h_k$.

Figure 10:
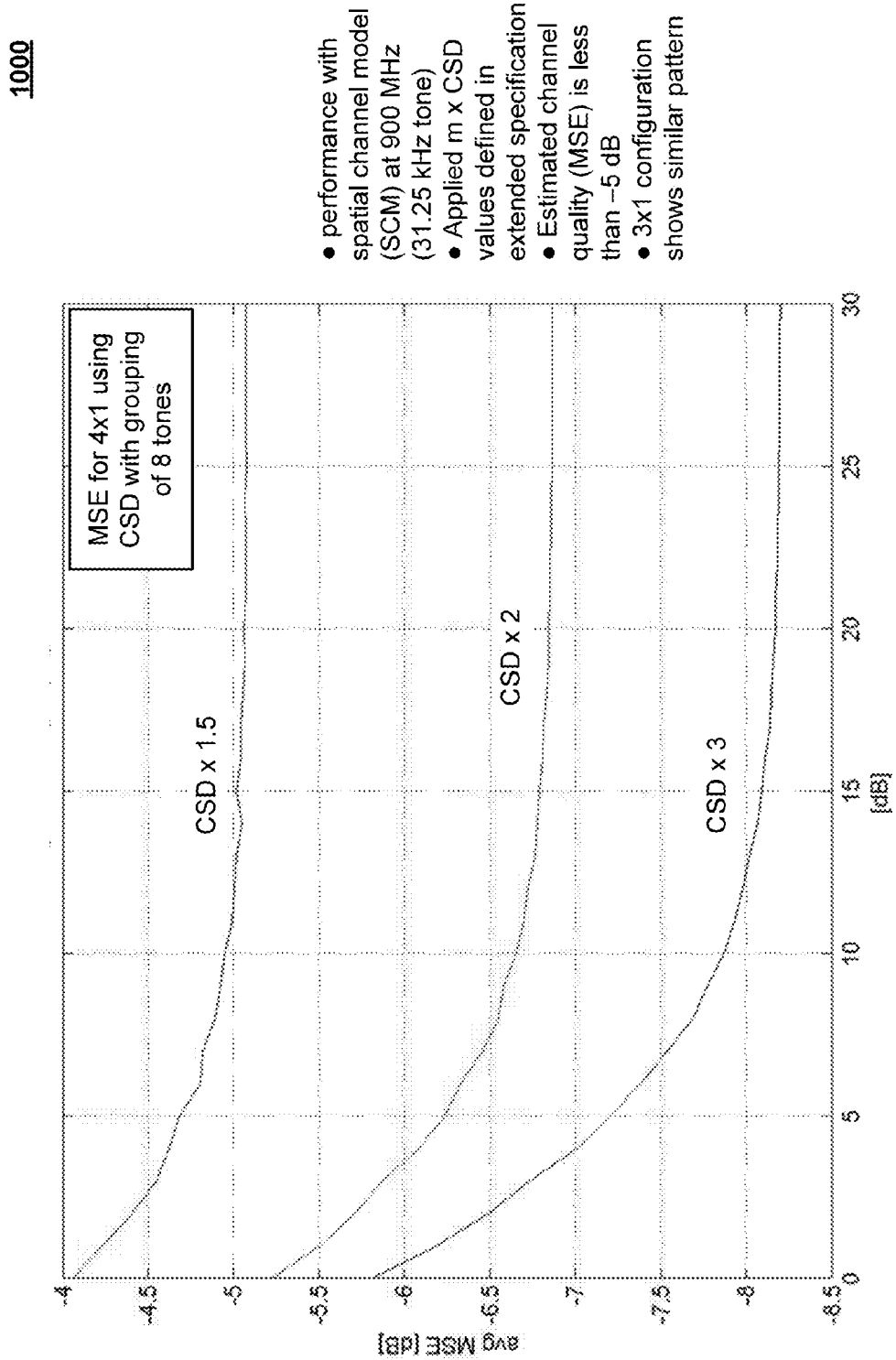
FIG. 10 illustrates an embodiment of a performance diagram with spatial channel model (SCM) at 900 MHz (31.25 kHz)).
Figure 11:
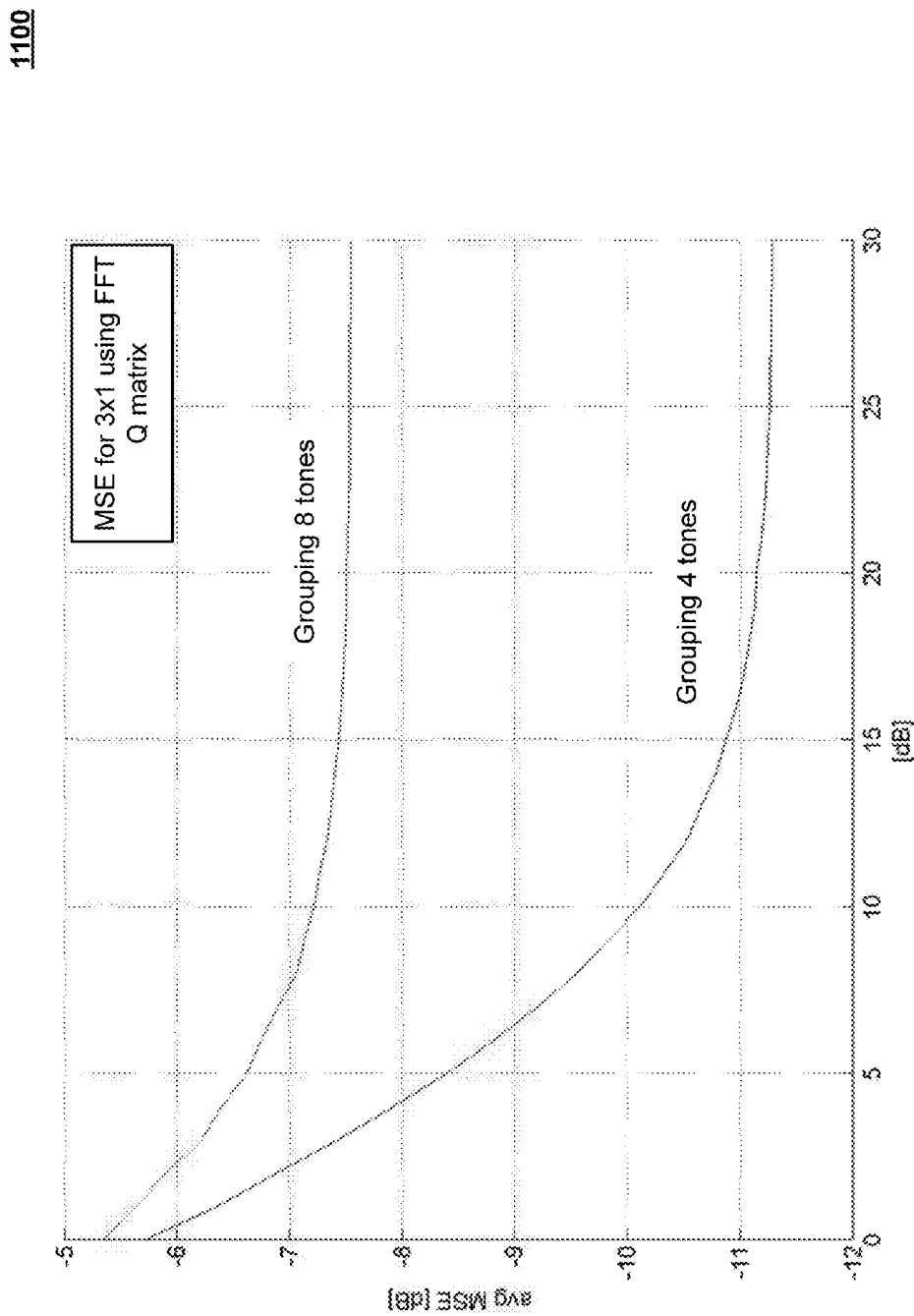
FIG. 11 illustrates an embodiment of another performance diagram (example 1).
Figure 12:
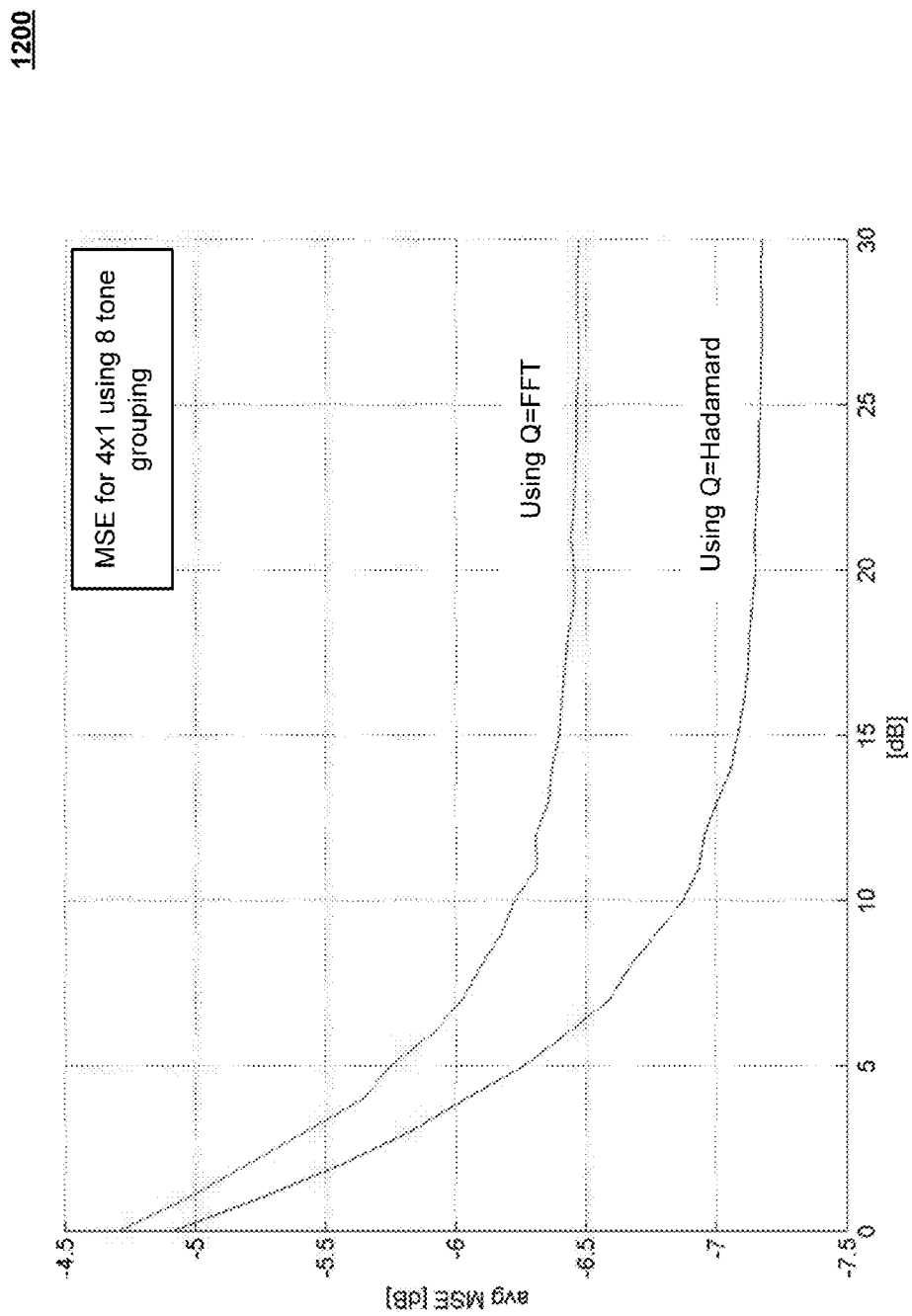
FIG. 12 illustrates an embodiment of another performance diagram (example 2).

FIG. 10 illustrates an embodiment 1000 of a performance diagram with spatial channel model (SCM) at 900 MHz (31.25 kHz)). In particular, an example is shown for a 4×1 channel configuration for three different CSD values with grouping 8 tones. FIG. 11 illustrates an embodiment 1100 of another performance diagram for a 3×1 channel configuration for using an FFT Q matrix with groupings of either 4 or 8 tones. FIG. 12 illustrates an embodiment 1200 of another performance diagram for a 4×1 channel configuration for a grouping 8 tones and either an FFT Q matrix or a Hadamard Q matrix. As shown in these examples, this abbreviated form of channel estimation achieves better than −5 dB of MSE channel estimation error. In some embodiments, smaller groupings may help the assumption ($h_{ikj}=h_{ikm}$) to be more realistic, but the P matrix may have a greater condition number as well. This technique may perform better that a CSD $D_k$ matrix, in some circumstances.

Figure 13:
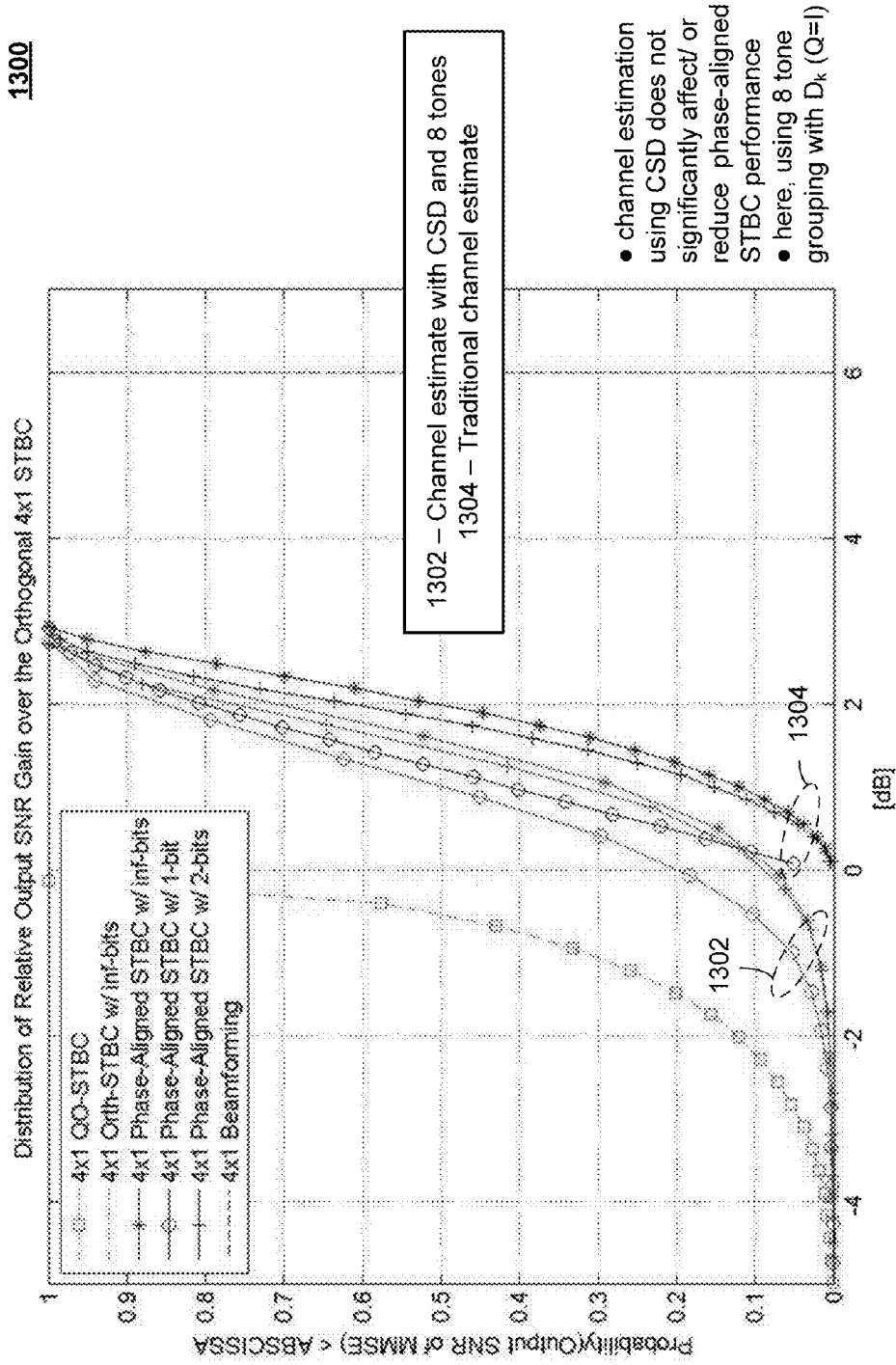
FIG. 13 illustrates an embodiment of a performance diagram showing impact on phase-aligned space time block coding (STBC).

FIG. 13 illustrates an embodiment 1300 of a performance diagram showing the impact of CSD channel estimation on phase-aligned space time block coding (STBC). While not expressly shown, similar impacts are achieved in output signal to noise ratio (SNR) with a SCM channel. As may be understood, performing channel estimation in such a manner obviates any need to send an NDP frame only for the channel estimation. A regular data packet (with a single stream) may be employed to estimate the Nt×1 channel accurately enough to obtain the phase information for Phase-Aligned STBC. A significant amount of feedback overhead savings may be achieved by piggybacking phase-only feedback information in an Nt×1 system, within an ACK frame. This phase-only feedback can be as little as 2-bits/tone for an 8-tone grouping, without a significant impact on the channel quality estimation. The information bits required to transmit such phase-only feedback for the 2 MHz band are only 13 information bits. The impact of additional 13 bits (2 bytes) on the throughput is negligible.

Figure 14:
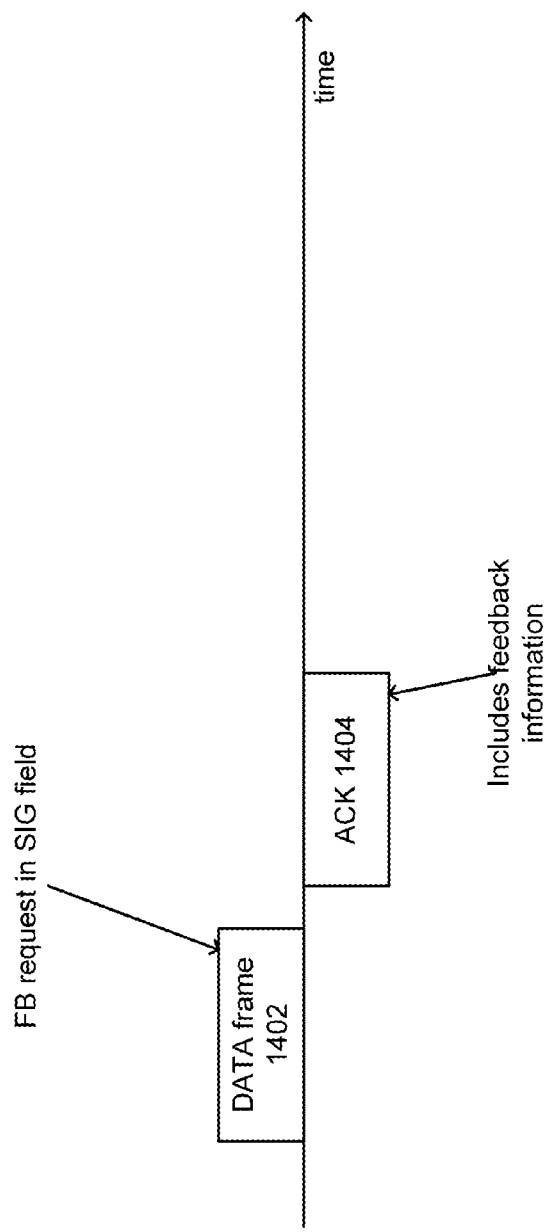
FIG. 14 illustrates an embodiment of delivery of feedback (FB) information using ACK (e.g., combined ACK and FB exchange).

FIG. 14 illustrates an embodiment 1500 of delivery of feedback (FB) information using ACK (e.g., combined ACK and FB exchange). In particular, a communication exchange is presented between two communication devices, such as an access point (AP), station (STA), or other devices, such as those described in conjunction with FIGS. 1-13, and in particular devices that utilize one or more of the channel estimation techniques that have been previously described. In operation, a transmitter of one device sends to the receiver of another device a first signal that includes a data frame 1402 having a request for phase feedback, such as indicator data in a signal (SIG) field of the data frame. In response to this request, a baseband processor of the receiving device generates phase feedback information based on a channel estimation of a wireless communication channel between the two communication devices in accordance with the channel estimation techniques previously described. A transmitter of the receiving device transmits an acknowledgement (ACK) frame 1404 to the other device in response to the data frame 1402. The ACK frame 1404 includes the phase feedback information.

In an embodiment, the data frame 1402 is a single data frame with a single long training field and a non-null data payload. The baseband processor of the receiving device generates the channel estimation from an analysis of this single data frame—and not based on a null data packet (NDP). As previously discussed, the baseband processor can generate the channel estimation based on a diagonal cyclic shift delay matrix or other CSD data.

As may be seen in with respect to diagram, a combined ACK with phase feedback information (a "FACK" frame) can be transmitted. This may allow for a relatively simple frame format with the addition of only a few bytes in the acknowledgement frame, such as three of fewer bytes of phase feedback information (MgmtActionFB). While the phase feedback is described above as being incorporated in an acknowledgement frame, such as via a modified acknowledgement frame format, other alternatives can be employed to transfer the requested phase feedback information back to the requesting communication device. Other alternatives may allow for formatting the phase feedback information in either a special purpose frame format apart from an acknowledgement frame or in an aggregated frame format that includes the acknowledgement frame. For example, the receiving device can transmit the ACK and MgmtActionFB as separate respective frames. With respect to the SIFS+PHY Header, a MAC Header should be additionally employed. There may be some considerations regarding TXOP control (e.g., the TXOP owner expect a transmitter to include a SIFS after ACK. Other alternatives may allow for using ACK+MgmtActionFB aggregated MAC (media access control) data protocol unit (A-MPDU). Some considerations include the overhead of AMPDU density and many bytes in management Frame (e.g. MAC header bytes).

It should be noted that while the request for phase feedback is discussed above as indicator data in the signal (SIG) field of the data frame, other indicators can be employed. In a further example, the phase feedback request could be made via indicator data in the PHY payload portion of the frame. Other locations in the data frame could also be used to carry request for phase feedback including other header and payload portions and/or in other layers of the protocol stack.

Figure 15:
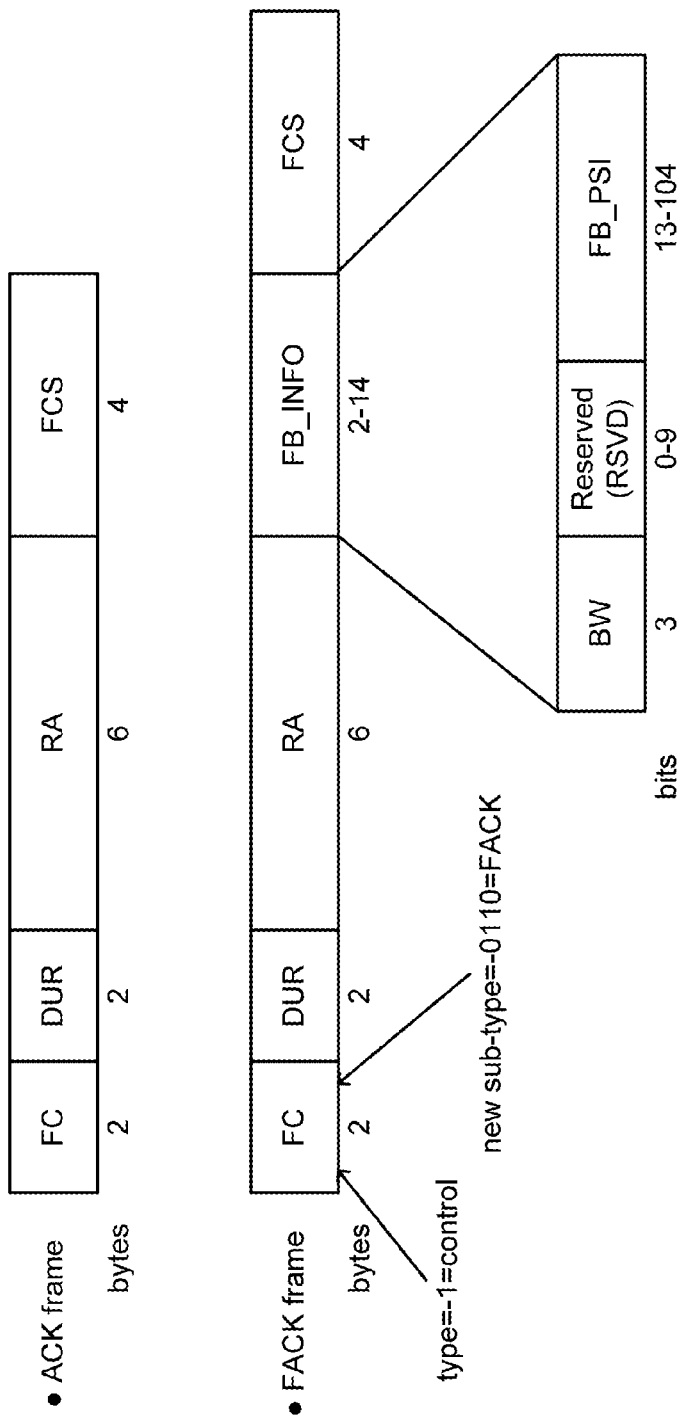
FIG. 15 illustrates an embodiment of FACK frame format.

FIG. 15 illustrates an embodiment 1600 of FACK frame format. Such a FACK frame may be operative to use one of reserved control subtypes, e.g. 0000-0110. FB_INFO is variable depending on bandwidth. The bandwidth (BW) is indicated within frame. The PHY payload with MCS0 is 5 (if BANDWIDTH=20 MHz) to 9 (if BW=160MHz) OFDM symbols long, where the original ACK is 5 OFDM symbols.

With 8 OFDM symbols of PHY preamble, the airtime for legacy ACK=52 μsec in 802.11n/ac, and the airtime approximately for FACK will be approximately 52 μsec (if BW=20 MHz) to 68 μsec (if BW=160 MHz) in 802.11n/ac. The first three fields still conform to IEEE 802.11 ProtocolVersion=00b.

With respect to DATA DUR field calculation, the feedback size in a FACK frame is known, because the bandwidth (BW) of DATA frame is known. Therefore, the size of FACK can be predicted accurately. Also, the DUR field value of DATA frame can be accurately assigned.

With respect to considering when to send angle feedback, a transmitter wireless communication device (e.g., AP, AP operating STA, etc.) may be implemented to send an indication that it desires feedback with phase-only information. Use a bit in the PHY signal field may be performed. For example, such operation may be made using FACK_REQ=FACK Request. Ideally, a receiver wireless communication device (e.g., STA, etc.) or responder communication device may reply with FACK, but ACK is acceptable, since in the worst case, DUR/NAV will exceed what is needed by a small amount.

In many cases, depending on the feedback size and MCS of the FACK or ACK, the FACK and ACK will be the same number of symbols anyway. For some cases, the FACK will be longer than the ACK, and if the FACK_REQuesting receiver wireless communication device (e.g., STA, etc.) calculated a DUR based on a FACK response, then NAV might be a little bit too long. This is not a serious issue, so the choice of response is left to the receiver wireless communication device (e.g., STA, etc.) or responder communication device.

Herein, a novel frame is proposed (e.g., a new FACK frame), which includes feedback information (phase-only) whose length is only a few bytes (e.g., 2 to 14 bytes, depending on bandwidth). Such phase-only information of Nt×1 channel can be obtained by Ng tone grouping, assuming the channel is quite flat, from a single stream packet transmission (with one LTF). The channel estimation quality of the proposed scheme has only marginal performance degradation (0 to 1 dB) on the phase-aligned STBC scheme. As may be understood, this does not require any additional sounding frame exchange (e.g., NDP), and only a few extra bytes of information, so the impact on overhead is negligible.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein including one of more baseband processing modules, one or more media access control (MAC) layers, one or more physical layers (PHYs), and/or other components, etc. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus, comprising:
   a receiver to receive a first signal from at least one additional apparatus including a data frame formatted in accordance with an Institute of Electrical and Electronic Engineers (IEEE) 802.11 standard, the data frame including a request for phase-aligned space time block coding (STBC) phase feedback included in an 802.11 signal (SIG) field of the data frame, wherein the data frame is a single data frame;
   a baseband processor, coupled to the receiver, generates phase feedback information based on a channel estimation of a wireless communication channel between the apparatus and the at least one additional apparatus, wherein the baseband processor generates the channel estimation from an analysis of the single data frame; and a transmitter, coupled to the baseband processor, transmits an acknowledgement (ACK) frame to the at least one additional apparatus in response to the data frame, wherein the ACK frame includes the phase feedback information.

2. The apparatus of claim 1, wherein:
the baseband processor generates the channel estimation based on a diagonal cyclic shift delay matrix.

3. The apparatus of claim 1, wherein:
the data frame includes a single long training field.

4. The apparatus of claim 1, wherein:
the data frame includes a non-null data payload.

5. The apparatus of claim 1, wherein:
the phase feedback information includes less than three bytes of data.

6. The apparatus of claim 1, wherein:
the apparatus being a wireless station (STA); and
the at least one additional apparatus being an access point (AP).

7. The apparatus of claim 1, wherein:
the apparatus being an access point (AP); and
the at least one additional apparatus being wireless station (STA).

8. An apparatus, comprising:
a transmitter to transmit a first signal to at least one additional apparatus including a data frame formatted in accordance with an Institute of Electrical and Electronic Engineers (IEEE) 802.11 standard, the data frame including a request for phase-aligned space time block coding (STBC) phase feedback included in a physical layer payload portion of the data frame; and
a receiver, to receive an acknowledgement (ACK) frame from the at least one additional apparatus in response to the data frame, wherein the ACK frame includes phase feedback information generated by the at least one additional apparatus;
wherein a baseband processor of the at least one additional apparatus generates the phase feedback based on a channel estimation of a wireless communication channel between the apparatus and the at least one additional apparatus; and
wherein, the data frame is a single data frame and the baseband processor generates the channel estimation from an analysis of the single data frame.

9. The apparatus of claim 8, wherein:
the baseband processor generates the channel estimation based on a diagonal cyclic shift delay matrix.

10. The apparatus of claim 8, wherein:
the data frame includes a single long training field.

11. The apparatus of claim 8, wherein:
the data frame includes a non-null data payload.

12. The apparatus of claim 8, wherein:
the phase feedback information includes less than three bytes of data.

13. An apparatus, comprising:
a receiver to receive a first signal from at least one additional apparatus including a single data frame, the single data frame including a request for phase-aligned space time block coding (STBC) phase feedback included in an Institute of Electrical and Electronic Engineers (IEEE) 802.11 standard signal (SIG) field in a preamble of the single data frame and a single long training sequence in the preamble of the single data frame;
a baseband processor, coupled to the receiver, generates phase feedback information based on a channel estimation of a wireless communication channel between the apparatus and the at least one additional apparatus based on an analysis of the single data frame that includes generating a cyclic shift delay matrix; and
a transmitter, coupled to the baseband processor, transmits the phase feedback information to the at least one additional apparatus in response to the data frame.

14. The apparatus of claim 13, wherein:
the phase feedback information is transmitted via one of: an acknowledgement frame, a feedback frame and an aggregated frame.

15. The apparatus of claim 13, wherein:
the single data frame includes a non-null data payload.

16. The apparatus of claim 13, wherein:
the phase feedback information includes less than three bytes of data.

* * * * *